(12) United States Patent
Kashiwada

(10) Patent No.: US 7,788,185 B2
(45) Date of Patent: Aug. 31, 2010

(54) ELECTRONIC PAYMENT SYSTEM, A RECORDING MEDIUM RECORDING AN ELECTRONIC PAYMENT PROGRAM AND AN ELECTRONIC PAYMENT APPARATUS

(75) Inventor: Takeshi Kashiwada, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 1219 days.

(21) Appl. No.: 10/913,237

(22) Filed: Aug. 6, 2004

(65) Prior Publication Data

US 2005/0038742 A1   Feb. 17, 2005

(30) Foreign Application Priority Data

Aug. 13, 2003   (JP)   ............... 2003-293251

(51) Int. Cl.
  *G06Q 20/00*   (2006.01)
(52) U.S. Cl. ............... 705/77; 705/27; 705/51; 705/64; 705/67; 705/71; 705/76; 705/79; 713/156; 713/159; 713/172; 340/571
(58) Field of Classification Search ............ 705/64–79, 705/27, 51; 713/156, 159, 172; 340/571
See application file for complete search history.

(56) References Cited

U.S. PATENT DOCUMENTS

| | | | | |
|---|---|---|---|---|
| 5,862,223 | A * | 1/1999 | Walker et al. ............... | 705/50 |
| 6,327,578 | B1 * | 12/2001 | Linehan ............... | 705/65 |
| 6,356,196 | B1 * | 3/2002 | Wong et al. ............... | 340/571 |
| 6,609,200 | B2 * | 8/2003 | Anderson et al. ............... | 713/176 |
| 6,629,081 | B1 * | 9/2003 | Cornelius et al. ............... | 705/30 |
| 6,882,983 | B2 * | 4/2005 | Furphy et al. ............... | 705/30 |
| 7,069,234 | B1 * | 6/2006 | Cornelius et al. ............... | 705/26 |
| 7,080,049 | B2 * | 7/2006 | Truitt et al. ............... | 705/75 |
| 7,165,174 | B1 * | 1/2007 | Ginter et al. ............... | 713/153 |
| 7,167,844 | B1 * | 1/2007 | Leong et al. ............... | 705/80 |
| 7,200,749 | B2 * | 4/2007 | Wheeler et al. ............... | 713/170 |
| 7,225,156 | B2 * | 5/2007 | Fisher et al. ............... | 705/50 |
| 7,349,871 | B2 * | 3/2008 | Labrou et al. ............... | 705/26 |
| 2001/0054064 | A1 * | 12/2001 | Kannan ............... | 709/203 |
| 2004/0156393 | A1 * | 8/2004 | Gupta et al. ............... | 370/469 |
| 2007/0185821 | A1 * | 8/2007 | Wells et al. ............... | 705/67 |

FOREIGN PATENT DOCUMENTS

| | | |
|---|---|---|
| JP | 2001-167163 | 6/2001 |
| JP | 2001-188833 | 7/2001 |

(Continued)

*Primary Examiner*—Pierre Eddy Elisca
*Assistant Examiner*—Shahid Kamal
(74) *Attorney, Agent, or Firm*—Greer, Burns & Crain, Ltd.

(57) ABSTRACT

The computer of a relay agency holds the money which a buyer pays for a commodity in a relay account. Then, the computer of the relay agency makes a payment transfer card and a notification card, and sends the notification card together with the request of purchase of the commodity to a seller. The relay agency sends the payment transfer card to the buyer. The buyer, after receiving the commodity, inserts the payment transfer card and the notification card into an automated teller machine of a bank, and gives instructions on the payment transaction to the computer of the relay agency. The computer of the relay agency transfers the money for the commodity from the relay account to the seller's account.

11 Claims, 13 Drawing Sheets

FOREIGN PATENT DOCUMENTS

| | | |
|---|---|---|
| JP | 2001-266031 | 9/2001 |
| JP | 2001-266039 | 9/2001 |
| JP | 2001-306982 | 11/2001 |
| JP | 2001-325545 | 11/2001 |
| JP | 2001-331754 | 11/2001 |
| JP | 2001-331755 | 11/2001 |
| JP | 2001-344541 | 12/2001 |
| JP | 2001-344542 | 12/2001 |
| JP | 2001-344543 | 12/2001 |
| JP | 2001-351041 | 12/2001 |
| JP | 2002-74219 | 3/2002 |

* cited by examiner

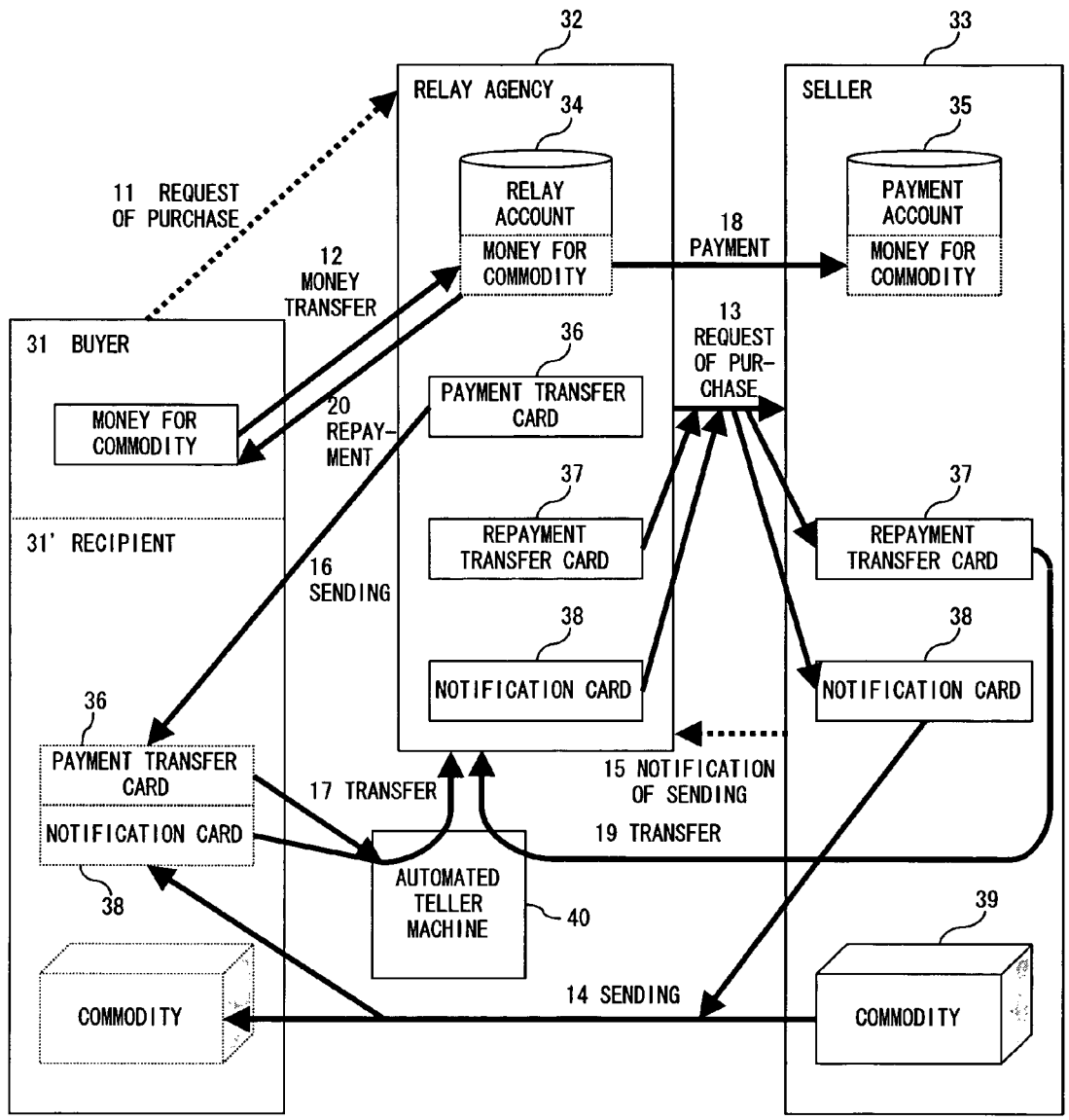
F I G. 2

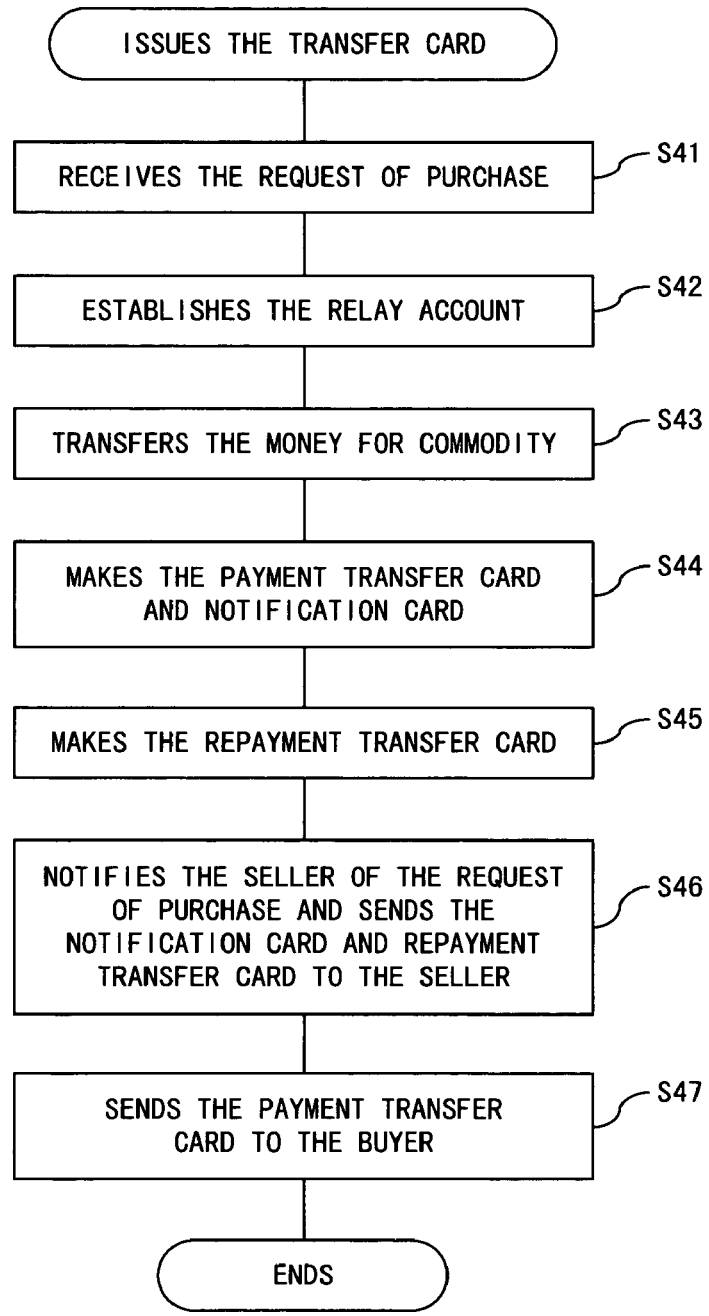
F I G. 4

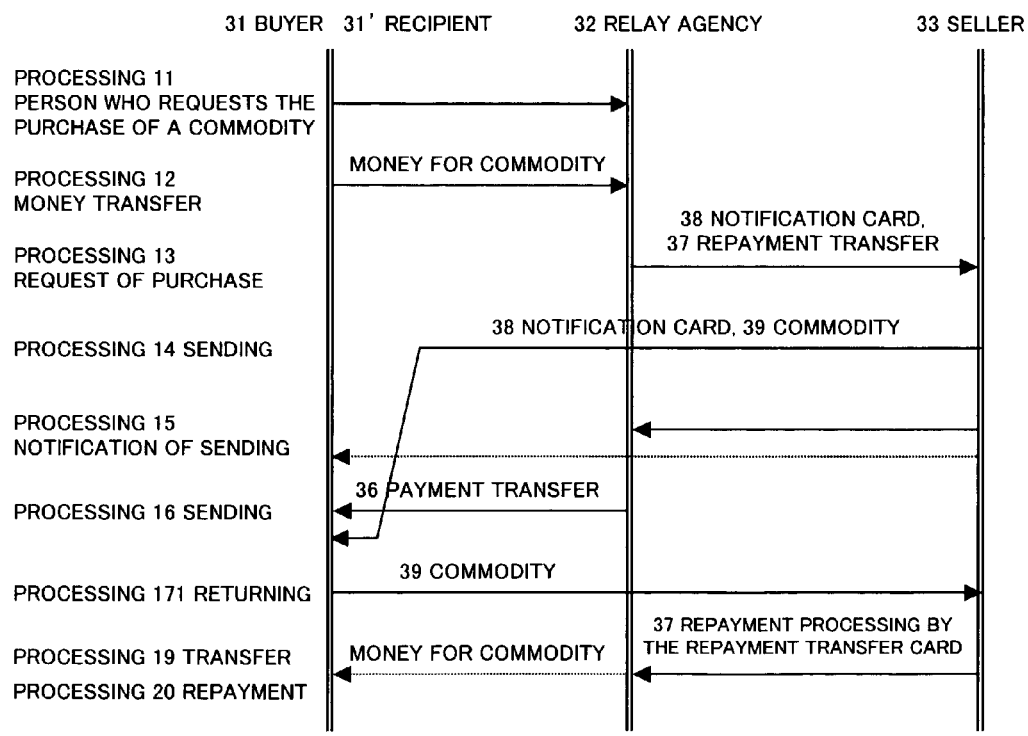
F I G. 9

ELECTRONIC PAYMENT SYSTEM, A RECORDING MEDIUM RECORDING AN ELECTRONIC PAYMENT PROGRAM AND AN ELECTRONIC PAYMENT APPARATUS

BACKGROUND OF THE INVENTION

1. Field of the Invention

The present invention relates to an electronic payment system, a recording medium recording an electronic payment program and an electronic payment apparatus.

2. Description of the Related Art

Electronic commerce in which individuals or companies purchase commodities by making use of the Internet has become widespread. In the electronic commerce which is conducted by using the Internet, etc., sellers of commodities introduce commodities by means of brochures, Web pages, e-mail, etc., and send commodities to buyers according to orders placed by the buyers.

As a method of paying the money for a commodity, there is a method of paying it when a buyer places an order for the commodity or after the buyer receives the commodity. From a buyer's point of view, it is desirable for him to pay money for the commodity after actually receiving it, but this method has a risk that no payment may be made to the seller in an accident or through wrongdoing.

On the other hand in the method in which the buyer pays money for the commodity when he places an order for it, there is a risk that the money he has paid may not be repaid to him, if he dose not receive the commodity due to an accident or through wrongdoing, or that the money he has paid may not be repaid to him if he has cancelled the order by means of cooling off, etc.

In other words, from the buyer's point of view, the following problems are likely to arise. (a) Although he has paid money for the commodity, the commodity is not sent to him; (b) although he has cancelled his order and has returned the commodity to the seller, the money he has paid is not repaid to him; and (c) there is a possibility that when he pays the seller, there are insufficient funds in his bank account to cover the required amount. From the seller's point of view, there are the following problems. (d) Although he has sent the commodity, no payment may be made for it by the buyer; and (e) although the order has been cancelled by the buyer, the commodity is not returned by him, and no payment is made by him.

In order to solve the above problems, described, for example, in patent document 1 is a payment method in which a service provider who mediates payment between a buyer and a seller is established, the buyer transfers the money for the commodity to the account of the service provider, and the service provider transfers the money for the commodity to the seller's account after making sure that the buyer has received the commodity.

However, the method of paying money for the commodity through the service provider cannot be said to be a method that fully secures the safety of transactions because anyone else can pretend to be the buyer and instruct the service provider to transfer the purchase price to the seller's account.

[Patent document 1] Jpn. patent publication No. 2001-266039 (paragraph 0007)
[Patent document 2] Jpn. patent publication No. 2001-167163
[Patent document 3] Jpn. patent publication No. 2001-188833
[Patent document 4] Jpn. patent publication No. 2001-266031
[Patent document 5] Jpn. patent publication No. 2001-306982
[Patent document 6] Jpn. patent publication No. 2001-325545
[Patent document 7] Jpn. patent publication No. 2001-331754
[Patent document 8] Jpn. patent publication No. 2001-331755
[Patent document 9] Jpn. patent publication No. 2001-344541
[Patent document 10] Jpn. patent publication No. 2001-344542
[Patent document 11] Jpn. patent publication No. 2001-344543
[Patent document 12] Jpn. patent publication No. 2001-351041
[Patent document 13] Jpn. patent publication No. 2002-074219

SUMMARY OF THE INVENTION

The purpose of the present invention is to provide a highly secure payment system in electronic commerce.

In the electronic payment system embodying the present invention in which a buyer of a commodity pays the money for the commodity to the seller via the relay agency, a computer of a relay agency comprises a holding unit holding the money for the commodity that the buyer pays in a relay account to be established every time a transaction is conducted, a card issue unit issuing a payment transfer card which is sent to the buyer and a notification card in which information necessary to implement the transfer of the money for the commodity by the payment transfer card is recorded, a receiving unit receiving the information recorded on the payment transfer card which is sent to the buyer or a recipient designated by the buyer from the relay agency and the information recorded on the notification card which is sent from the seller to the buyer or the recipient, and a payment unit paying the money for the commodity from the relay account to the seller's account based on the information of the payment transfer card and notification card which is received by the receiving unit.

According to the present invention, after the buyer actually receives the commodity, he inserts the payment transfer card and the notification card into, for example, an automated teller machine of a bank, etc. and the automated teller machine transmits the information which it has read to the computer of the relay agency, thus instructing the payment of the money for the commodity. Therefore, unless the information recorded in the two cards is fully provided, the computer cannot instruct the payment of the money for the commodity, so that it is possible to prevent anyone who pretends to be the buyer from instructing the payment of the money for the commodity. Thus, the safety of electronic commerce can be enhanced.

In another electronic payment system embodying the present invention in which the buyer of the commodity pays the money for the commodity to the seller via the relay agency, a computer of a relay agency comprises a holding unit holding the money for a commodity that a buyer has paid in a relay account to be established every time a transaction is conducted, a transmission unit transmitting the payment transfer information which makes the transfer of the money for the commodity from a relay account to a seller's account possible to the terminal of the buyer or a recipient designated by the buyer via a communication line, and transmitting information necessary to implement the transfer of the money for the commodity to the seller via a communication line, and a payment unit paying the money for the commodity from the relay account to the seller's account when the payment unit receives the payment transfer information and information necessary to implement the transfer of the money for the commodity to the seller's account from the terminal of the buyer or the recipient.

For example, payment transfer information is a transfer program which instructs the computer of the relay agency to transfer money, or is parameter data which makes the transfer program execute transfer processing. Information necessary to implement a payment transfer transaction is data for starting such as a password and a cipher key for starting the transfer program.

According to the present invention, after the buyer or a recipient designated by the buyer receives the commodity, unless he transmits the payment transfer information and information necessary to implement a payment transfer transaction from his terminal to the computer of the relay agency, no money is transferred from the relay account to the seller, so that no one can pretend to be the buyer and instruct the computer to transfer the money for the commodity to the seller. The buyer or the recipient can use a terminal such as a personal computer at his home to transmit payment transfer information and information necessary to implement a payment transfer transaction, so the procedures for payment are greatly simplified, and the convenience of electronic commerce is enhanced.

The aforesaid electronic payment system comprises a computer of the relay agency and an automated teller machine, and the automated teller machine has a transmission unit reading the information stored in the payment transfer card and the notification card when the buyer or a recipient designated by the buyer inserts the payment transfer card and the notification card into the automated teller machine, transmitting the read information to the computer of the relay agency, and the receiving unit of the computer of the relay agency may be made to receive the information in the payment transfer card and the notification card which is transmitted from the automated teller machine.

With the system configuration built in such a way as this, the buyer or the recipient can go through a procedure of payment only by inserting the payment transfer card and the notification card into the automated teller machine of a bank, etc., so that an error in input such as an account number can be removed.

In the aforesaid invention, when the seller sends a transaction nonperformance notification to the relay agency, the payment unit is made to cancel the repayment of the money for the commodity to the buyer or the payment on credit from the relay account.

With the system configuration built in such a way as this, even if a transaction is cancelled for some reason or other on the part of the seller, the money for the commodity can be surely repaid to the buyer's account from the relay account, or the payment on credit can be cancelled.

When the payment unit receives the suspension of the transaction from the buyer before the buyer receives a commodity dispatch notification from the seller, the payment unit repays the money for the commodity from the relay account to the buyer's account or cancels the payment on credit.

With the system configuration built in such a way as this, even if a transaction is cancelled by the buyer, the money for the commodity can be repaid to the buyer's account by the relay agency, or any payment on credit can be cancelled, so that it is possible to avoid such a problem that the money for the commodity is not repaid because of the negligence or malicious intent on the part of the seller.

In case the payment unit does not receive a commodity dispatch notification from the seller by a designated date, the payment unit automatically repays the money for the commodity to the buyer's account from the relay account, or cancels the payment on credit.

With the system configuration built in such a way as this, in case the seller does not take any procedure for sending the commodity for a specific period, it is possible to repay the money for the commodity from the relay account to the buyer's account, so that the buyer who suffers a disadvantage if he is delayed in obtaining the commodity can ask for the purchase of the commodity without anxiety.

The payment unit automatically transfers the money for the commodity from the relay account to the seller's account in a specific period of time after the commodity is sent.

With the system configuration built in such a way as this, even if the buyer who receives the commodity does not pay the money for the commodity, the money for the commodity can be paid to the seller, so that the safety of transaction on the part of the seller can be secured.

When the payment unit receives a commodity return notification from the buyer or the recipient, the payment unit suspends the payment of the money for the commodity from the relay account to the seller's account, and when the return of the commodity to the seller is confirmed, the payment unit repays the money for the commodity from the relay account to the buyer's account, or cancels the payment on credit.

With the system configuration built in such a way as this, even if the buyer sends a false commodity return notification and does not pay the money for the commodity, it is possible to surely transfer the money for the commodity to the seller.

The electronic payment system embodying the present invention also has a unit which sends the notification card to the seller, and which sends the payment transfer card to the buyer or the recipient.

With the system configuration built in such a way as this, no payment transaction can be conducted without having both the notification card to be sent from the seller and the payment transfer card to be sent from the relay agency, so that it is possible to prevent anyone who pretends to be the buyer from conducting an illegal payment transaction.

The present invention is a computer readable recording medium which records an electronic payment program by which the buyer pays the money for the commodity to the seller via the relay agency, and when the electronic payment program holds the buyer's money for the commodity in the relay account and transmits the payment transfer information which makes the transfer of the money for the commodity from the relay account to the seller's account possible to the terminal of the buyer or a recipient designated by the buyer and transmits information necessary to implement the payment transfer transaction to the seller via a communication line, and receives the payment transfer information and the information necessary to implement the payment transfer transaction from the terminal of the buyer or a recipient designated by the buyer, the electronic payment program transfers the money for the commodity from the relay account to the buyer's account.

With the system configuration built in such a way as this, after the buyer or a recipient designated by the buyer receives the commodity, unless the payment transfer information and information necessary to implement the payment transfer transaction are transmitted from the terminal to the computer of the relay agency, no money for the commodity is transferred from the relay account to the seller's account, so that no one can pretend to be the buyer to instruct the payment unit to pay the money for the commodity. The buyer or the recipient can use the terminal of a personal computer, etc. at his home to transmit the payment transfer information and information necessary to implement the payment transfer transaction, so the procedures for payment are greatly simplified and the convenience of electronic commerce can be much enhanced.

BRIEF DESCRIPTION OF THE DRAWINGS

FIG. 2 shows the explanatory drawing of the electronic payment system in the first embodiment.

FIG. 4 is a flowchart of the card issue processing.

FIG. 9 is a flowchart when a commodity is returned.

DESCRIPTION OF THE PREFERRED EMBODIMENTS

Figure 1:
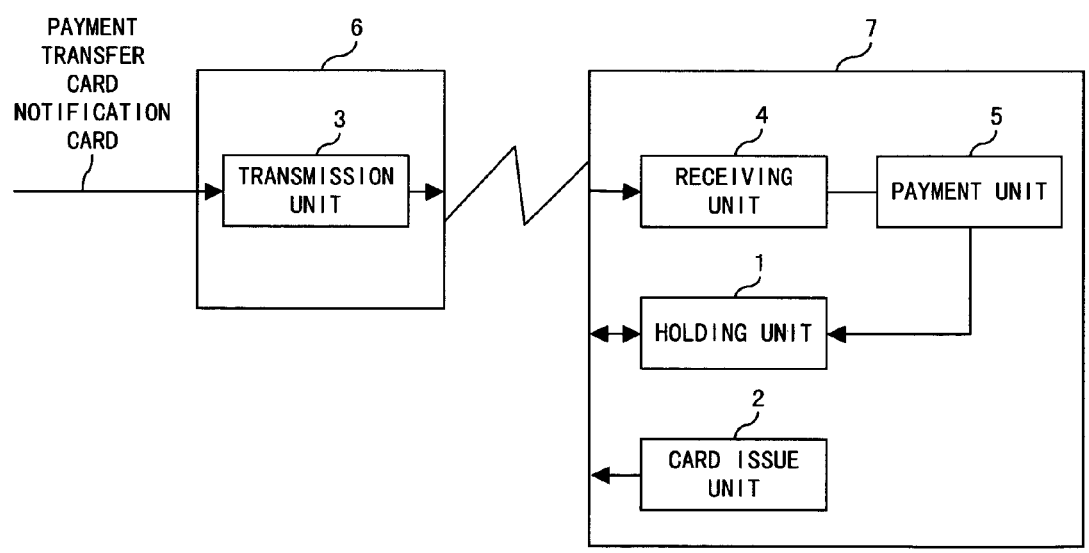
FIG. 1 shows the basic configuration of the present invention.

Described below are the embodiments of the present invention with reference to the drawings. FIG. 1 shows the basic configuration of the present invention.

In the electronic payment system in which a buyer of a commodity pays the money for the commodity to a seller via a relay agency, a computer of a relay agency comprises a holding unit 1 holding the money for the commodity that the buyer has paid in a relay account to be established every time a transaction is conducted, a card issue unit 2 issuing a payment transfer card which is sent to the buyer and a notification card in which information necessary to implement the transfer of the money for the commodity by the payment transfer card is recorded, a receiving unit 4 receiving the information recorded in the payment transfer card which the relay agency sends to the buyer or a recipient designated by the buyer and the information recorded in the notification card which is sent from the seller to the buyer or the recipient, and a payment unit 5 paying the money for the commodity from the relay account to the seller's account based on the information of the payment transfer card and notification card which is received by the receiving unit 4, According to this configuration, after the buyer receives the commodity actually, he inserts the payment transfer card and the notification card into, for example, an automated teller machine of a bank, etc. and the automated teller machine transmits the information which it has read to the computer of the relay agency, thus instructing the payment of the money for the commodity. Therefore, unless the information recorded in the two cards is fully provided, the computer cannot instruct the payment of the money for the commodity, so that it is possible to prevent anyone who pretends to be the buyer from instructing the payment of the money for the commodity. Thus, the safety of electronic commerce can be enhanced.

Figure 3:
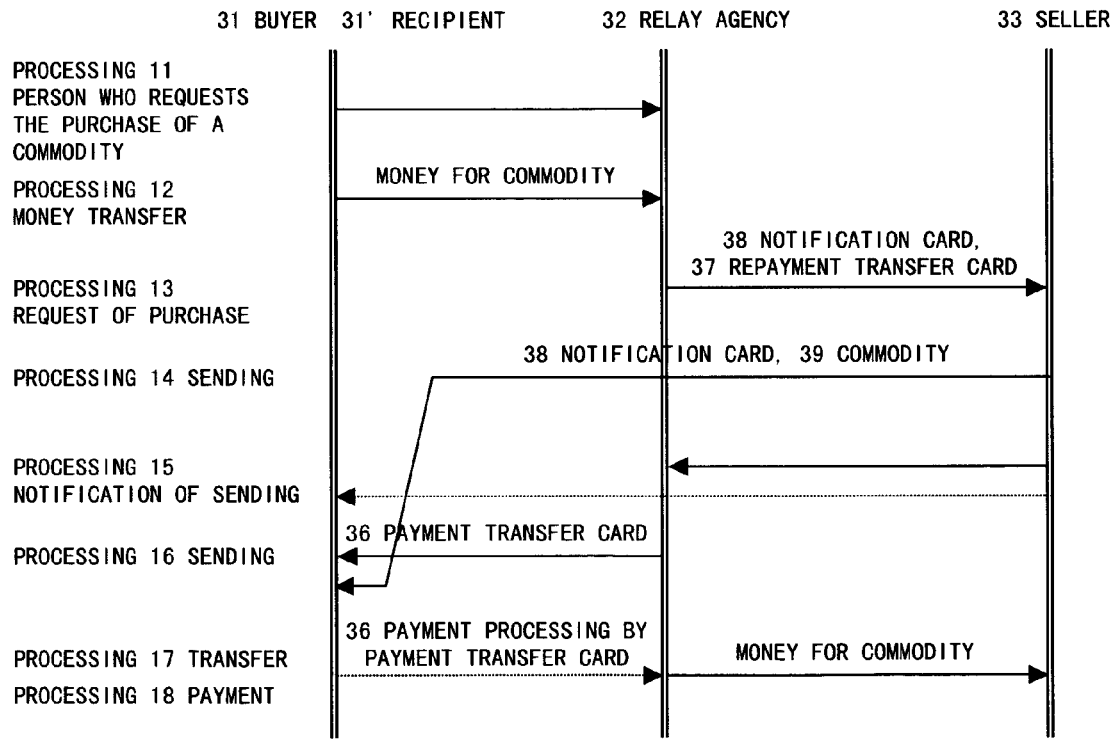
FIG. 3 is a flowchart of the payment processing in the first embodiment.

FIG. 2 shows the explanatory drawing of the electronic payment system in the first embodiment of the present invention. FIG. 3 is a flowchart of the payment processing. The operation to be conducted by both a buyer 31 and a seller 33 is also included in the flowchart shown in FIG. 3.

In FIG. 2, a computer of a relay agency 32 has a function for making a relay account 34 every time a transaction is conducted and holding the money for a commodity which is transferred by the buyer 31, a function for issuing a payment transfer card 36, a repayment transfer card 37 and a notification card 38, a function for receiving the information of the payment transfer card 36 and notification card 38, and a function for transferring the money for the commodity from the relay account 34 to the account of the seller 33 when said information is received.

When deciding to purchase a commodity, the buyer 31 asks the relay agency 32 to purchase the commodity (Processing 11 in FIG. 2 and FIG. 3: request of purchase) Then, the buyer 31 transfers the money for the commodity to the relay agency 32 (Processing 12 in FIG. 2 and FIG. 3: money transfer).

When the money for the commodity is paid by the buyer 31, the computer of the relay agency 32 holds the money for the commodity in the relay account 34 which is made every time a transaction is conducted. Then, said computer makes the payment transfer card 36, the repayment transfer card 37 and the notification card 38 in which information necessary to implement money transfer by the payment transfer card is recorded, and sends the request of purchase of the commodity, the notification card 38 and the repayment transfer card 37 to the seller 33 (Processing 13 in FIG. 2 and FIG. 3: request of purchase).

The seller 33 sends the commodity 39 and the notification card 38 to the buyer or a recipient 31' (Processing 16 in FIG. 2 and FIG. 3: sending), and notifies the relay agency 32 that it has sent the commodity to the buyer 31 (Processing 15 in FIG. 2 and FIG. 3: notification of sending).

When the relay agency 32 receives the notification of sending of the commodity from the seller 33, the relay agency 32 sends the payment transfer card 36 to the buyer 31 (Processing 16 in FIG. 2 and FIG. 3: sending).

When the buyer 31 or the recipient 31' receives the commodity, he goes to a bank where an automated teller machine 40 is installed, inserts the payment transfer card 36 and the notification card 38 into the automated teller machine 40, and instructs said machine to transfer the money for the commodity from the relay account 34 to the account 35 of the seller 33 (Processing 17 in FIG. 2 and FIG. 3: transfer).

When the computer of the relay agency 32 receives information of the payment transfer card 35 and the notification card 38 from the automated teller machine 40, said computer executes the payment processing for transferring the money for the commodity to the account of the seller 33 from the relay account 34 for the transaction corresponding to said information (Processing 18 in FIG. 2 and FIG. 3: payment).

In order to instruct the relay agency 32 to transfer the money for the commodity in accordance with the processing described above, both the payment transfer card 36 and the notification card 38 are required, so no one can pretend to be the buyer 31 or the recipient 31' and instruct the relay agency 32 to transfer the money for the commodity to the seller 33.

FIG. 4 is a flowchart of the card issue processing of the computer of the relay agency 32. The operation on the part of the buyer 31 is also included in FIG. 4.

The control unit of the computer establishes the relay account 34 every time a transaction is conducted (Step S42 in FIG. 4) when receiving the request of purchase from the buyer 31 (Step S41 in FIG. 4).

When the buyer 31 transfers the money for the commodity to the relay account 34 (Step S43 in FIG. 4), the computer of the relay agent 32 makes the payment transfer card 36, notification card 38 and repayment transfer card 37 (Step S44 and Step S45 in FIG. 4). Said computer notifies the seller 33 of the request of purchase, and at the same time sends the notification card 38 and repayment transfer card 37 to the seller 33 (Step S46 in FIG. 4). Upon receiving the notification of sending of the commodity from the seller 33, said computer sends the payment transfer card 36 to the buyer 31 (Step S47 in FIG. 4).

Figure 5:
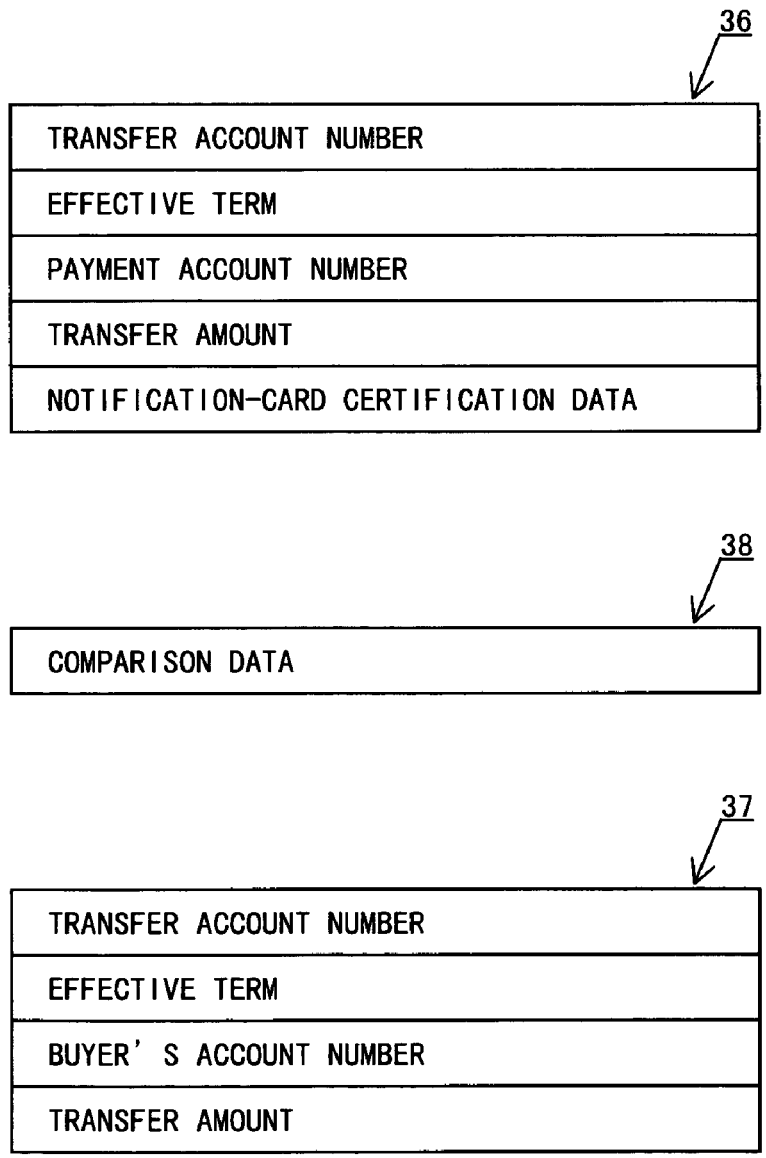
FIG. 5 shows the data configuration of the payment transfer card, notification card and repayment transfer card.

Described below is the data recorded in the payment transfer card 36, repayment transfer card 37 and notification card 38. FIG. 5 shows the configuration of the data recorded in the payment transfer card 36, the configuration of the data recorded in the notification card 38 and the configuration of the data recorded in the repayment transfer card 37.

Recorded in the payment transfer card 36 are a transfer account number (relay account 34), an effective term of the card, a payment account number of the seller (payment account 35), a transfer amount and notification-card certification data, as shown in FIG. 5.

Comparison data for comparing with the notification card certification data of the payment transfer card 36 is recorded in the notification card 38.

Recorded in the repayment transfer card 37 are a transfer account number (relay account 34), an effective term of the card, an account number of the buyer and a transfer amount. The repayment transfer card 37 is used to repay the money for the commodity to the buyer 31 when the sale of the commodity is stopped after the money for the commodity has been paid. The money for the commodity can be transferred from the relay account 34 of the relay agency 32 recorded in the repayment transfer card 37 to the account of the buyer 31.

In accordance with the processing described above, the computer of the relay agency 32 establishes a relay account every time a transaction is conducted when receiving the request of purchase of the commodity, makes the payment transfer card 36 and the notification card 38, and sends these cards to the buyer 31 and the seller 33.

The relay account 34 is established every time a transaction arises and is abolished when the transaction is completed or stopped.

Next, described below is the payment transfer processing using the payment transfer card 36 and the notification card 38 with reference to the flowchart shown in FIG. 6. The operation on the part of the buyer 31 is also included in the flowchart shown in FIG. 6.

After the buyer 31 or a recipient 31' designated by the buyer 31 receives the commodity, he inserts the payment transfer card 36 into an automated teller machine 40 of a bank, etc. (Step S51 in FIG. 6) to pay the money for the commodity.

Figure 6:
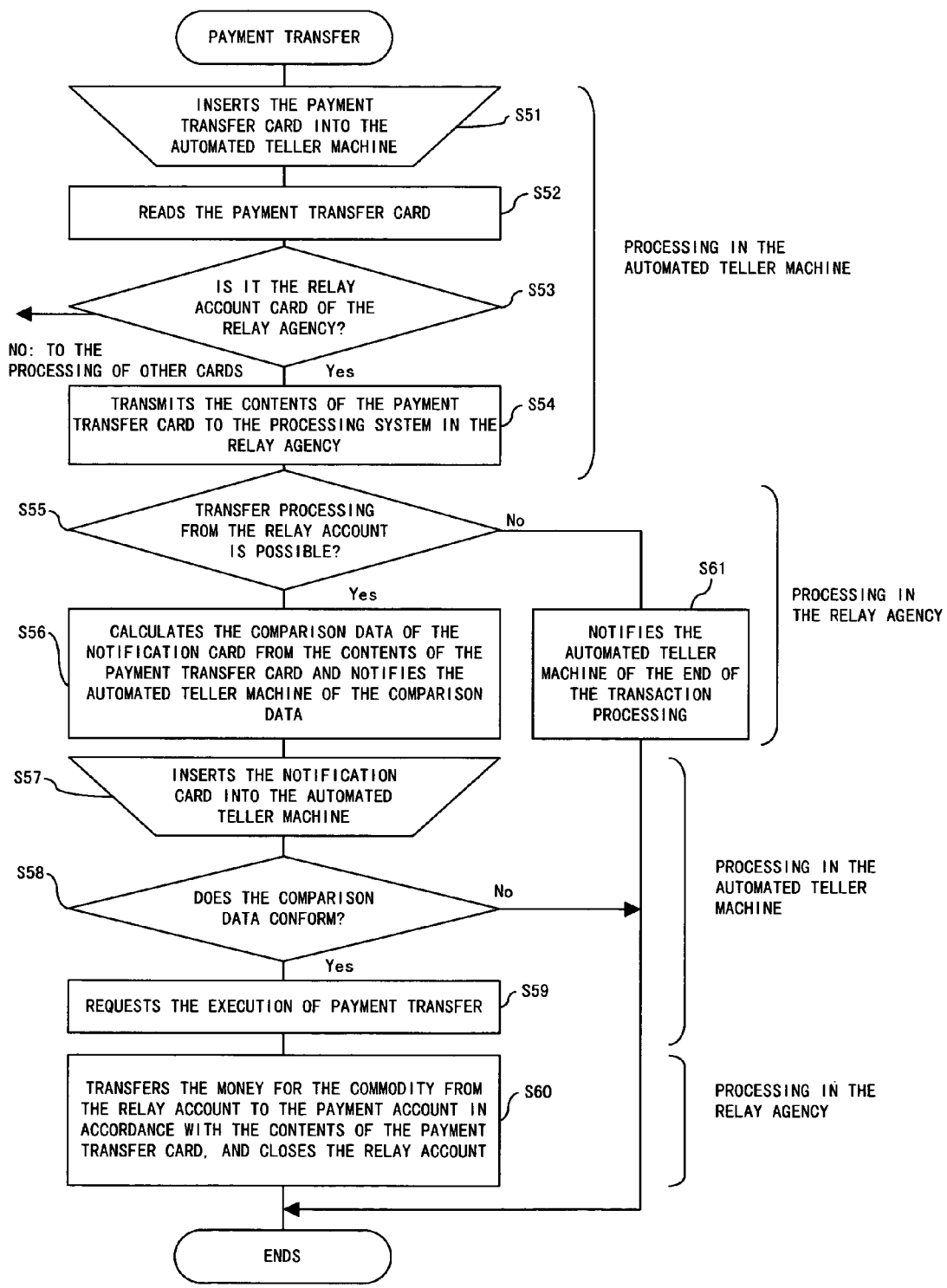
FIG. 6 is a flowchart of the payment transfer processing.

The control unit of the automated teller machine 40 reads data recorded in the payment transfer card 36 and judges whether the card is the one of the relay agency 32 (Step S52 in FIG. 6). If it is found to be the card of the relay agency 32 (Yes in Step S53), said control unit proceeds to Step S54 to transmit the data recorded in the payment transfer card 36 to the payment processing system in the relay agency 32.

If it is not the card of the relay agency 32 (No in Step S53), said control unit executes the processing of other cards.

The computer of the relay agency 32 judges whether there is a relay account 34 corresponding to the relay account number in the data received from the automated teller machine 40 and whether the payment transfer card 36 is within its term of validity (Step S55 in FIG. 6).

If the payment transfer card 36 is within its term of validity and the corresponding relay account 34 exists (Yes in Step S55), the computer of the relay agency 32 proceeds to Step S56 to calculate the comparison data of the notification card 38 from the data of the payment transfer card 36 and transmits the calculated comparison data to the automated teller machine 40.

The buyer 31 or the recipient 31', then, inserts the notification card 38 into the automated teller machine 40 (Step S57 in FIG. 6).

The automated teller machine 40 judges whether the comparison data recorded in the notification card 38 conforms to the comparison data transmitted from the computer of the relay agency 32 (Step S58 in FIG. 6).

If the comparison data of the notification card 38 conforms to the comparison data transmitted from the computer of the relay agency 32 (Yes in Step S58), the automated teller machine 40 proceeds to Step S59 to instruct the relay account 34 corresponding to the relay agency 32 to transfer the money for the commodity to the account of the seller 33.

The computer of the relay agency 32 transfers the money for the commodity from the relay account 34 designated by the automated teller machine 40 to the account of the seller 33 (Step S60 in FIG. 6).

If the computer of the relay agency 32 judges that it cannot transfer the money for the commodity to the account of the seller 33 because the corresponding relay account 34 judged in Step S55 does not exist or for any other reason (No in Step S55), said computer proceeds to Step S61 to notify the automated teller machine that the transaction has finished.

If the comparison data of the notification card 38 does not conform to the comparison data transmitted from the computer of the relay agency 32 in Step 58 (No in Step S58), said computer does not instruct the relay agency 32 to transfer the money for the commodity.

Thus, unless both the payment transfer card 36 and the notification card 38 are used, said computer cannot instruct the relay agency 32 to transfer the money for the commodity, so it is possible to prevent anyone else who pretends to be the buyer 31 or the recipient 31' from transferring the money for the commodity from the relay account 34 to any other account.

Next, described below is the processing to be performed when the seller 33 stops selling the commodity after the buyer 31 has transferred the money for the commodity to the relay agency 32, with reference to the flowchart shown in FIG. 7.

Figure 7:
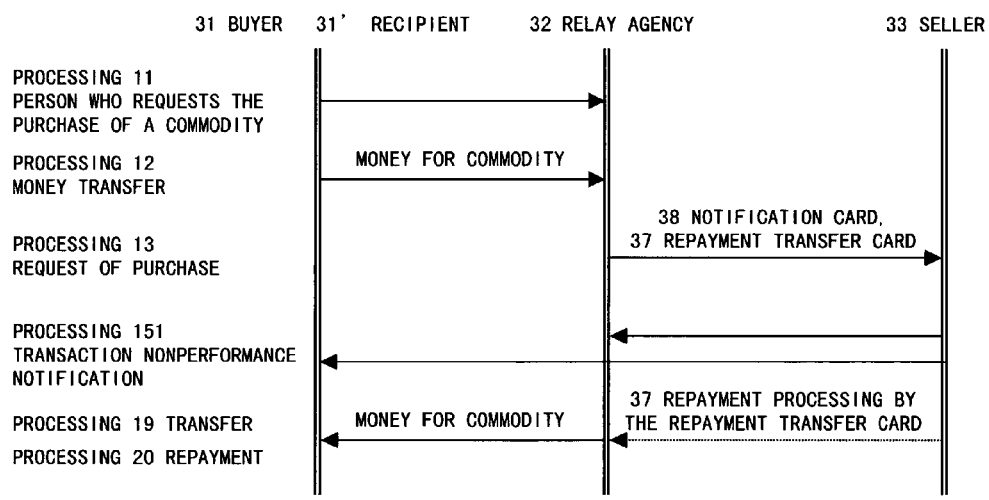
FIG. 7 is a flowchart when the sale of a commodity is stopped.

Since processing 11 to processing 13 in FIG. 7 is the same as that in FIG. 3, the description of these processes is omitted. When the seller 33 stops the sale of the commodity, he sends a transaction nonperformance notification to the relay agency 32 and the buyer 31 (Processing 151 in FIG. 7: transaction failure notification).

The seller 33, then, inserts the repayment transfer card 37 into the automated teller machine 40 and instructs the relay agency 32 to repay the money for the commodity (Processing 19 in FIG. 7: transfer).

The automated teller machine 40 reads data recorded in the repayment transfer card 37 and transmits the data to the computer of the relay agency 32.

After the computer of the relay agency 32 receives the data of the repayment transfer card 37 from the automated teller machine 40, said computer transfers the money for the commodity held in the corresponding relay account 34 to the account of the buyer 31 to repay the money (Processing 20 in FIG. 7: repayment).

In a payment system which does not use the repayment transfer card 37, when the relay agency 32 receives a transaction nonperformance notification or when an actual dispatch of the commodity is beyond a commodity dispatch time limit that has been notified to the buyer 31 in advance, the computer of the relay agency 32 repays the money for commodity held in the corresponding relay account 34 to the account of the buyer 31.

Figure 8:
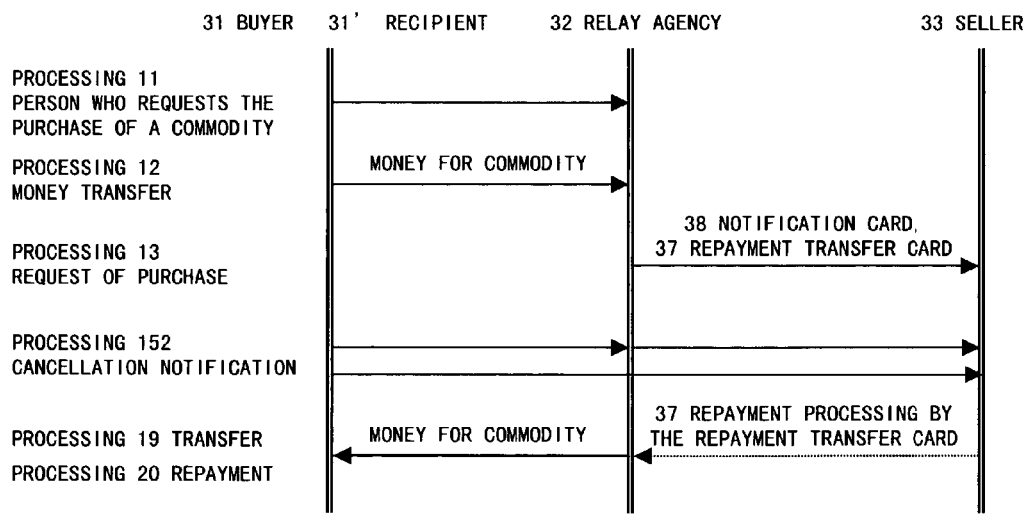
FIG. 8 is a flowchart when the purchase of a commodity is stopped.

Next, described below is the processing to be performed when the buyer 31 stops buying the commodity, with reference to the flowchart shown in FIG. 8. Processing 11 to processing 13 in FIG. 8 is the same as that in FIG. 3. When the buyer 31 stops buying the commodity, he sends a cancellation notice to the relay agency 32 and the seller 33 (Processing 132 in FIG. 8: cancellation notice).

If the commodity is not dispatched yet and the transaction can be cancelled, the seller 33 uses the repayment transfer card 37 and instructs the automated teller machine 40 to transfer the money (Processing 19 in FIG. 8: transfer).

When the repayment transfer card 37 is inserted, the automated teller machine 40 reads the data recorded in the repayment transfer card 37 and transmits the read data to the computer of the relay agency 32.

The computer of the relay agency 32, when receiving the data of the repayment transfer card 37, repays the money in the relay account 34 designated by said data to the account of the buyer 31 (Processing 20 in FIG. 8: repayment).

In a payment system which does not use the repayment transfer card 37, when the computer of the relay agency 32 receives a cancellation notice from the buyer 31, said computer repays the money held in the corresponding relay account 34 to the buyer 31.

Next, described below is the processing to be preformed when the buyer 31 returns the commodity after receiving it, with reference to the flowchart shown in FIG. 9.

Processing 11 to processing 16 shown in FIG. 9 is the same as that in FIG. 3. When the buyer 31 returns the commodity which he has received, he uses the repayment transfer card 37 and instructs the automated teller machine 40 to transfer the money (Processing 19 in FIG. 9: transfer).

The computer of the relay agency 32, when receiving the data of the repayment transfer card 37, transmits the money for the commodity in the relay account 34 designated by the data to the account of the buyer 31 (Processing 20 in FIG. 9: repayment).

Next, described below is the processing to be performed when the commodity has not arrived yet and the commodity is sent again, with reference to the flowchart shown in FIG. 10.

Figure 10:
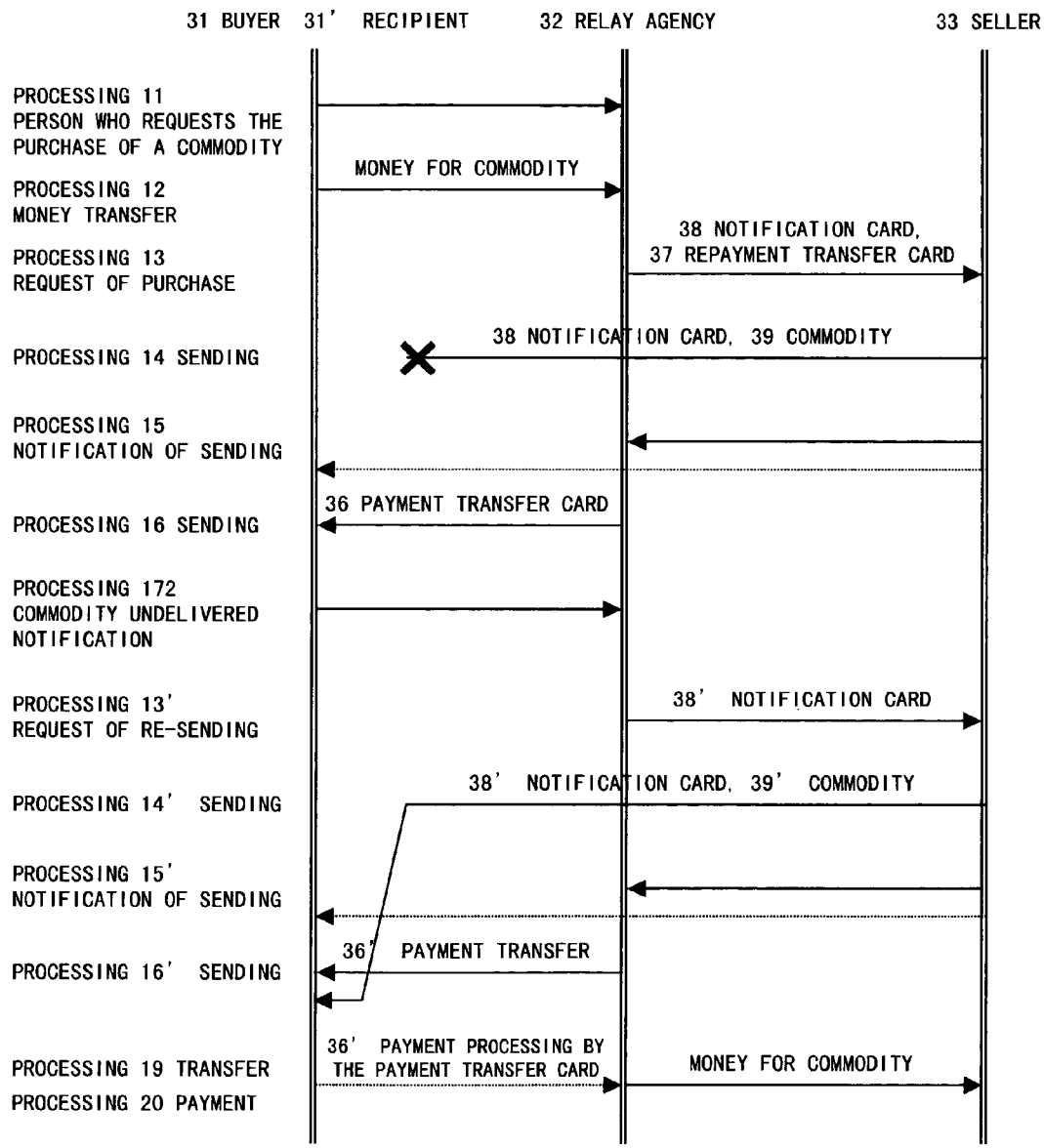
FIG. 10 is a flowchart when a commodity is re-sent.

Processing 11 to processing 16 shown in FIG. 10 is the same as that in FIG. 3. If the buyer 31 does not receive the commodity after a certain period has passed since he received the payment transfer card 36, he sends a commodity undelivered notice to the relay agency 32 (Processing 172 in FIG. 10: commodity undelivered notification).

The computer of the relay agency 32, when receiving the commodity undelivered notice, notifies the seller 33 that the commodity has not been delivered to the buyer 31, and at the same time newly makes the payment transfer card 36' and the notification card 38', and sends the notification card 38' to the seller 33 again (Processing 13' in FIG. 10: request of re-sending).

The seller 33 sends the commodity and the reissued notification card 38' to the buyer 31 (processing 14' in FIG. 10: sending).

The seller 33: also sends a notification of sending to the computer of the relay agency 32 (processing 15' in FIG. 10: notification of sending).

The computer of the relay agency 32 sends the newly-made payment transfer card 36' to the buyer 31 (Processing 16' in FIG. 10: sending).

The buyer 31, when receiving the commodity, inserts the payment transfer card 36' into the automated teller machine of a bank, etc. and instructs the relay agency 32 to transfer the money for the commodity (Processing 17 in FIG. 10: transfer).

The computer of the relay agency 32, when receiving the data of the payment transfer card 36' from the automated teller machine 40, transfers the money held in the relay account 34 designated by the payment transfer card 36' to the account of the seller 33 (Processing 18 in FIG. 10: payment).

Figure 11:
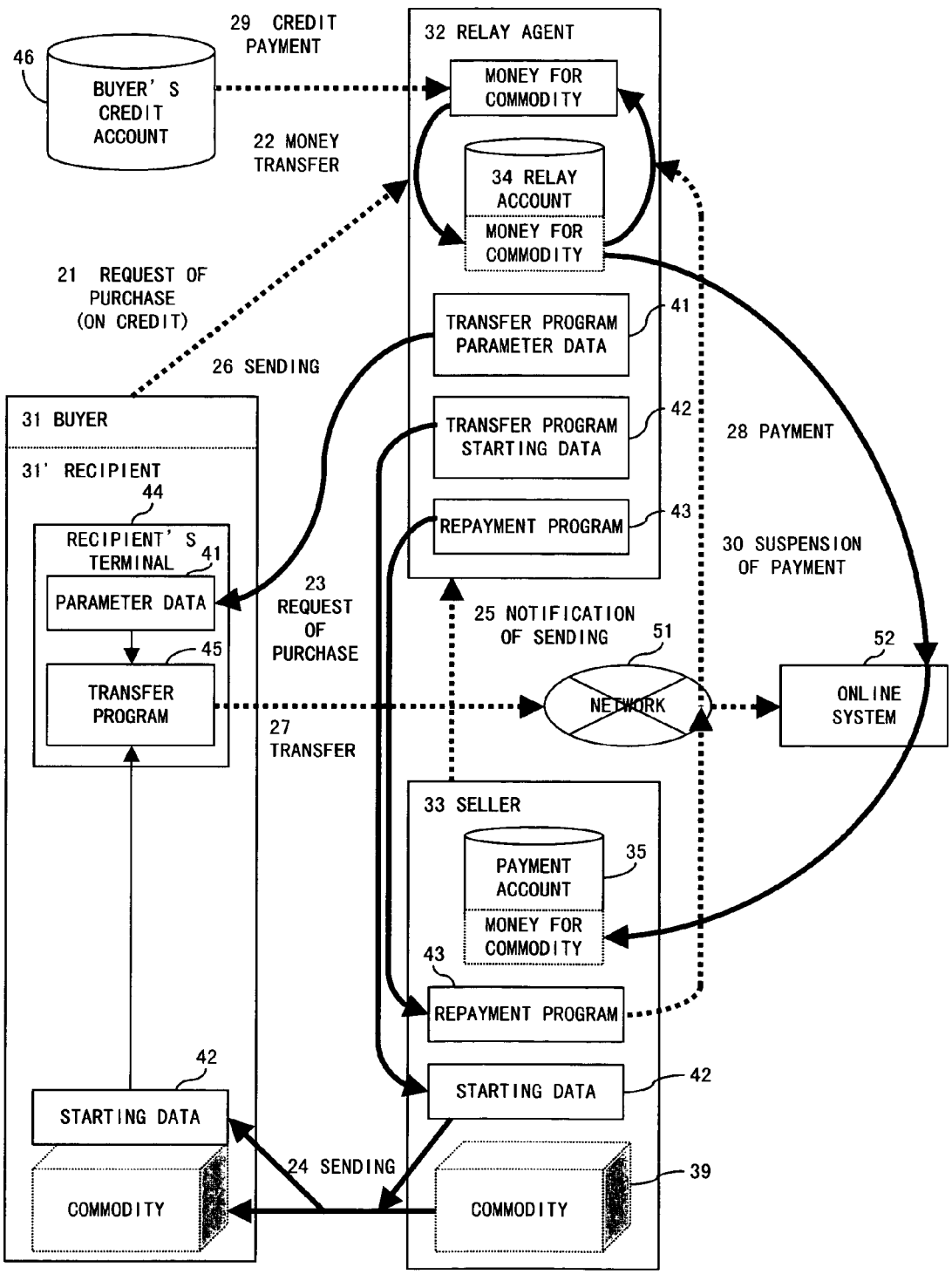
FIG. 11 shows the explanatory drawing of the electronic payment system in the second embodiment.
Figure 12:
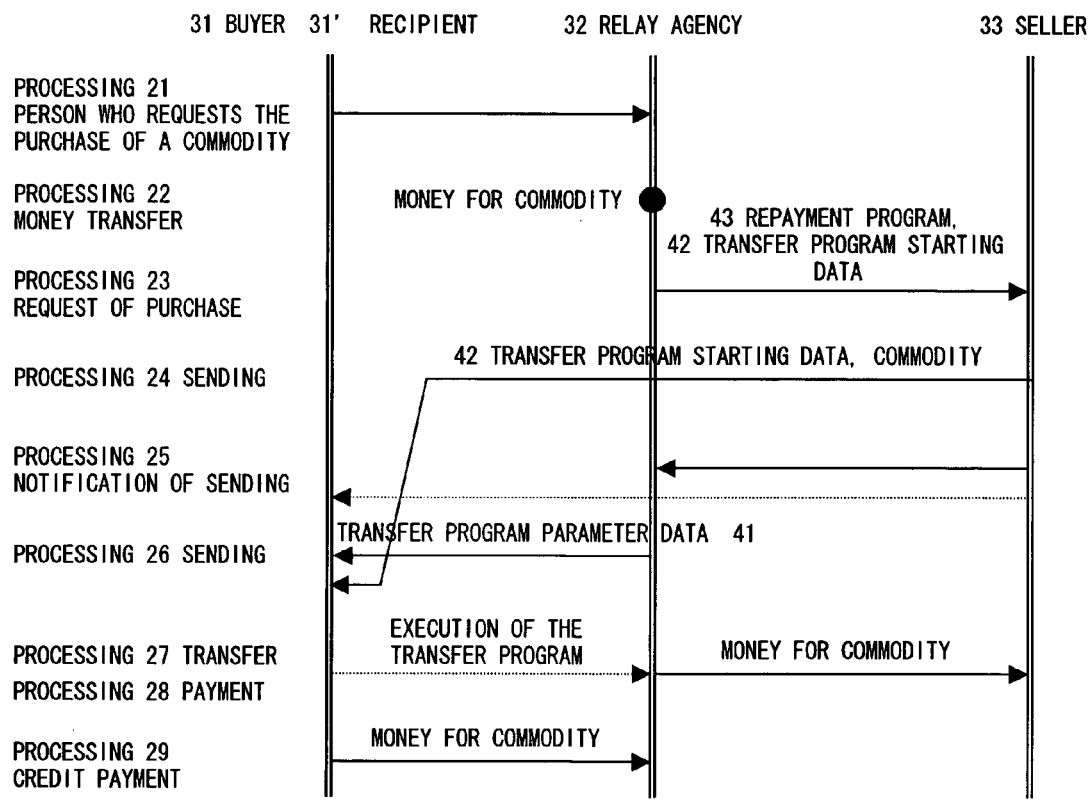
FIG. 12 is a flowchart of the payment processing in the second embodiment.

FIG. 11 shows the explanatory drawing of the electronic payment system in the second embodiment of the present invention. FIG. 12 is the flowchart of the payment processing in the second embodiment.

This second embodiment transmits the payment transfer information for transferring the money for a commodity from a relay agency 32 to the account of a seller 33 and the information necessary to implement the payment transfer transaction from the relay agency 32 to the terminal of a buyer 31 and the seller 33 via a network.

The buyer 31 requests the relay agency 32 to purchase a specific commodity on credit (Processing 21 in FIG. 11 and FIG. 12: request of purchase).

The account management system of the computer in the relay agency 32 establishes a relay account 34 every time a transaction is conducted, and prepares the money for the commodity for and on behalf of the buyer 31 and holds that money in the relay account 34 when the buyer 31 requests the purchase of the commodity on credit (Processing 22 in FIG. 11 and FIG. 12: receipt of money). The relay agency 32 may be made to request a credit company to pay the money for the commodity and hold that money in the relay account 34 without preparing the money for and on behalf of the buyer 31.

Then, the account management system of the computer in the relay agency 32 transmits the request of purchase of the commodity, a repayment program 43 and data 42 for starting a transfer program to the terminal or server of the seller 33 via a network 51 (Processing 23 in FIG. 11 and FIG. 12: request of purchase).

The repayment program is used to instruct the account management system in the relay agency 32 to repay the money for the commodity when the sale of the commodity is stopped or when the buyer 31 cancels the commodity. Since this repayment program 43 does not have any function other than that for making the money for the commodity in the relay account paid to the account of the buyer 31, this program cannot be used for any other purpose than repayment.

The data 42 for starting the transfer program is used to start a transfer program 45 in which the buyer 31 instructs the account management system in the relay agency 32 to transfer the money for the commodity.

When receiving the request of purchase of a commodity from the relay agency 32, the seller 33 sends the commodity and transmits the data 42 for starting the transfer program to the terminal of the buyer 31 or recipient 31' via the network 51 (Processing 24 in FIG. 11 and FIG. 12: sending), and notifies the relay agency 32 that it has sent the commodity (Processing 25 in FIG. 11 and FIG. 12: notification of sending).

The account management system in the relay agency 32, when receiving the notification of sending of the commodity, transmits transfer program parameter data 41 to the terminal of the buyer 31 via the network 51 (Processing 26 in FIG. 11 and FIG. 12: sending).

The buyer 31 or the recipient 31' inputs the received transfer program parameter data 41 and the data 42 for starting the transfer program into a terminal 44 (for example, a personal computer), and executes the transfer program 45 stored therein. When the buyer 31 requests the purchase of a commodity, the transfer program 45 may be transmitted from the account management system in the relay agent 32 to the terminal of the buyer 31 or the recipient 31', or it may be sent in the form of a medium such as CDROM.

When the data 42 for starting the transfer program and the transfer program parameter data 41 are inputted, the transfer program 45 accesses an online system 52 via the network 51, and transmits the same information as that for the payment transfer card 36 in the first embodiment such as a relay account number and an account number of a seller 33. The online system 52 communicates with the account management system in the relay agency 32 and instructs the account management system to transfer the money for the commodity from the corresponding relay account 34 to the account of the seller 33 (Processing 27 in FIG. 11 and FIG. 12: transfer).

When the transfer of the money for the commodity is instructed by the transfer program 45, the account management system in the relay agency 32 transfers said money from the designated relay account 34 to the account of the seller 33, and at the same time asks a credit company to pay the credit money and pays the money which the relay agency 32 has prepared on behalf of the buyer 31 (Processing 28 in FIG. 11 and FIG. 12: payment).

According to the second embodiment described above, unless the transfer program parameter data 41 and the data 42 for starting the transfer program are both inputted into the terminal 44, the transfer program cannot be started and the transfer of the money for the commodity cannot be instructed, so that it is possible to prevent anyone else from pretending to be the buyer 31 or the recipient 31' and instructing the transfer of the money for the commodity illegally. Thus, the safety of electronic commerce can be enhanced. Furthermore, it is possible to automatically instruct the transfer of the money for the commodity held in the relay account 34 from the terminal 44 at a user's home via the network 51 using the transfer program, so the payment procedures in electronic commerce such as online shopping and online auction can be simplified.

Moreover, when the seller 33 stops the sale of the commodity, or when the buyer 31 cancels his order for the commodity, all the procedures for repaying the money for the commodity can be performed on line using the repayment program 43, so the repaying procedures on the part of the seller 33 can be also simplified.

An example has been described above in which the parameter data 41 which operates the transfer program 45 is transmitted from the relay agency 32 to the terminal of the buyer 31 or the recipient 31' in the second embodiment described above. However, the transfer program 45 which can instruct only a specific relay account 34, instead of the parameter data 41, to transfer the money for the commodity may be transmitted from the relay agency 32 to the terminal of the buyer 31.

Figure 13:
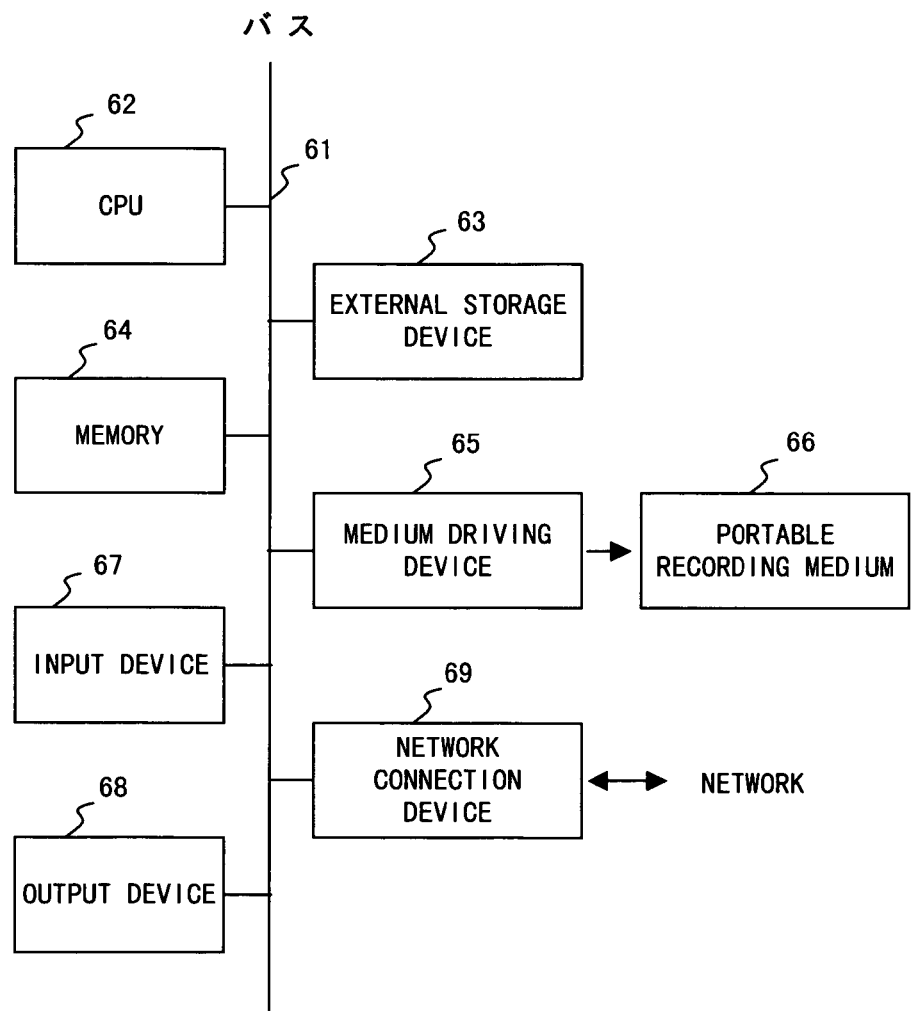
FIG. 13 shows the block diagram of the information processing device.

Described below is an example of the hardware configuration of an information processing device such as a computer embodying the present invention and the buyer's terminal 44, with reference to FIG. 13.

OS is executed by a CPU 62 stored in a storage device such as a hard disk connected via the CPU 62 and a bus 61.

A medium driving device 65 is a reading or writing device for a portable recording medium 66 such as a flexible disk, CDROM, DVD and an IC card.

An input device 67 comprises a keyboard and a mouse, and transmits a user's instructions to the CPU 62, or outputs the processing result of the CPU 62. An output device 68 comprises a display, a printer, etc.

A network connection device 69 communicates with those who provide information via a network such as an Internet network. Those who provide information may hold a program related to the present invention in a server, etc. and may download said program to the information processing device via the network.

The aforesaid information processing device has both the network connection device 69 which downloads the program via the network and the medium driving device 65, but it is not necessary to have all these devices.

According to the aforesaid embodiments of the present invention, unless a buyer has both a payment transfer card and a notification card or both payment transfer information and payment transaction information, he cannot instruct the payment of the money for a commodity, so it is possible to prevent anyone else from pretending to be the buyer and instructing the transfer of the money for the commodity illegally. Thus, the safety of payment in electronic commerce can be enhanced. Furthermore, the buyer or the recipient can receive the payment transfer information and the information necessary to implement a payment transfer transaction by the terminal at his home, etc. and transmit said pieces of information to the computer of a payment organization to give necessary instructions on the payment, so that the procedures for payment are greatly simplified and the convenience of electronic commerce can be much enhanced. In addition, payment processing can be automated by using the transfer card or the transfer program, so that troubles such as an erroneous money transfer due to an error in input can be prevented.

What is claimed is:

1. An apparatus used in an electronic payment system in which a buyer of a commodity pays money for the commodity to a seller of the commodity via a relay agency, the apparatus including a computer of the relay agency comprising:

a holding device holding the money for the commodity that the buyer has paid in a relay account to be established every time a transaction is conducted;

a card issue device issuing a payment transfer card to the buyer recording a relay account number into which the buyer pays money, a payment account number of the seller, and a notification card certification data, and a notification card to the seller recording comparison data for comparing with the notification card certification data of the payment transfer card;

a receiving device receiving data, transmitted from a teller machine, recorded on the payment transfer card and the notification card; and a payment device paying the money for the commodity from the relay account to the seller's account when receiving a comparison results that the notification card certification data of the payment transfer card matches the comparison data of the notification card;

wherein when the payment transfer card and the notification card are inserted into the teller machine to pay the money for the commodity, the teller machine determines whether or not the notification card certification data of the payment transfer card matches the comparison data of the notification card, and transmits the determination result to the computer of the relay agency.

2. The apparatus used in an electronic payment system according to claim 1, further comprising:

a transmission device in the teller machine reading the information stored in the payment transfer card and the notification card when the buyer or a recipient designated by the buyer inserts the payment transfer card and the notification card into the teller machine, and transmitting the read information to the computer of the relay agency;

wherein the receiving device of the computer in the relay agency receives the information in the payment transfer card and the notification card which is transmitted from the teller machine.

3. The apparatus used in an electronic payment system according to claim 1, wherein when the seller sends a transaction nonperformance notification to the relay agency, the payment device cancels the repayment of the money for the commodity to the buyer or the payment on credit from the relay account.

4. The apparatus used in an electronic payment system according to claim 1, wherein when the payment device receives the suspension of a transaction from the buyer before the buyer receives a commodity dispatch notification from the seller, the payment device repays the money for the commodity from the relay account to the buyer's account or cancels the payment on credit.

5. The apparatus used in an electronic payment system according to claim 1, wherein when the payment device does not receive a commodity dispatch notification from the seller by a designated date, the payment device automatically repays the money for the commodity to the buyer's account from the relay account, or cancels the payment on credit.

6. The apparatus used in an electronic payment system according to claim 1, wherein the payment device automatically transfers the money for the commodity from the relay account to the seller's account in a specific period of time after the commodity is sent.

7. The apparatus used in an electronic payment system according to claim 1, wherein when the payment device receives a commodity return notification from the buyer or the recipient, the payment device suspends the payment of the money for the commodity from the relay account to the seller's account, and when the return of the commodity to the seller is confirmed, the payment device repays the money for the commodity from the relay account to the buyer's account, or cancels the payment on credit.

8. The apparatus used in an electronic payment system according to claim 1, wherein the electronic payment system has a device which sends the notification card to the seller, and which sends the payment transfer card to the buyer or the recipient.

9. A computer readable recording medium which records an electronic payment program by which a buyer pays money for a commodity to a seller via a relay agency, the electronic payment program including the steps comprising:

holding the buyer's money for the commodity in the relay account to be established every time a transaction is conducted;

issuing a payment transfer card to the buyer recording a relay account number into which the buyer pays money, a payment account number of the seller, and a notification card certification data, and a notification card to the seller recording comparison data for comparing with the notification card certification data of the payment transfer card;

receiving data, transmitted from a teller machine, recorded on the payment transfer card and the notification card; and paying the money for the commodity from the relay account to the seller's account when receiving a comparison result that the notification card certification data of the payment transfer card matches the comparison data of the notification card;

wherein when the payment transfer card and the notification card are inserted into the teller machine to pay the money for the commodity, the teller machine determines whether or not the notification card certification data of the payment transfer card matches the comparison data of the notification card, and transmits the determination result to the computer of the relay agency.

10. An electronic payment program recorded on a computer readable storage medium for enabling a buyer of a commodity to pay the money for a commodity to a seller of the commodity via a relay agency, the electronic payment program including the steps comprising:

holding the money for the commodity that the buyer has paid in a relay account to be established every time a transaction is conducted;

issuing a payment transfer card to the buyer and a notification card in which information necessary to implement the transfer of the money for the commodity by the payment transfer card is recorded to the seller;

receiving the payment transfer card which is sent to the buyer or a recipient designated by the buyer from the relay agency and the information recorded on the notification card which is sent from the seller to the buyer or the recipient; and paying the money for the commodity from the relay account to the seller's account based on the information of the payment transfer card and notification card which are received by the receiving device;

wherein the buyer or the recipient instructs a computer of the relay agency to pay the money for the commodity using the payment transfer card and the notification card after the buyer or the recipient receives the commodity.

11. The electronic payment program according to claim 10, further comprising the steps of reading the information stored in the payment transfer card and the notification card when the payment transfer card and the notification card are inserted by the buyer or a recipient designated by the buyer transmitting the read information from an automated teller machine to the computer of the relay agency, and receiving the information in the payment transfer card and the notification card which is transmitted from the automated teller machine.

* * * * *